(12) United States Patent
Lin et al.

(10) Patent No.: US 11,340,656 B2
(45) Date of Patent: May 24, 2022

(54) CRADLE FOR AN INFORMATION HANDLING SYSTEM

(71) Applicant: DELL PRODUCTS, LP, Round Rock, TX (US)

(72) Inventors: Chung-An Lin, Zhonghe District (TW); Tung-Yi Chen, Banciao (TW); Chian-Ting Chen, Jhonghe District (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/035,943

(22) Filed: Sep. 29, 2020

(65) Prior Publication Data

US 2022/0100232 A1 Mar. 31, 2022

(51) Int. Cl.
*G06F 1/16* (2006.01)
*G06F 13/42* (2006.01)

(52) U.S. Cl.
CPC ........ *G06F 1/1632* (2013.01); *G06F 13/4282* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 5,751,548 A * | 5/1998 | Hall | F16C 11/10 248/122.1 |
| 7,911,779 B1 * | 3/2011 | Tarnoff | G06F 1/1626 361/679.43 |
| 10,452,096 B1 | 10/2019 | Keilers et al. | |
| 2001/0000447 A1 * | 4/2001 | Thompson | G06F 1/1632 361/679.41 |
| 2006/0018089 A1 * | 1/2006 | Chou | G06F 3/0202 361/679.09 |
| 2009/0106567 A1 * | 4/2009 | Baarman | H02J 50/90 713/300 |
| 2009/0284216 A1 * | 11/2009 | Bessa | H02J 7/0044 320/101 |
| 2010/0014226 A1 * | 1/2010 | Nishimoto | G11B 33/123 361/679.01 |
| 2010/0172081 A1 * | 7/2010 | Tian | G06F 1/1632 361/679.29 |
| 2013/0092811 A1 * | 4/2013 | Funk | H05K 5/0204 248/371 |
| 2014/0001087 A1 * | 1/2014 | Yu | A45C 11/00 206/756 |
| 2018/0107248 A1 * | 4/2018 | Pischel | G06F 1/1632 |
| 2018/0253125 A1 * | 9/2018 | Morrison | H05K 7/20 |

* cited by examiner

*Primary Examiner* — Xanthia C Cunningham
(74) *Attorney, Agent, or Firm* — Larson Newman, LLP

(57) ABSTRACT

A cradle for an information handling system includes a base and a stand. The stand extends perpendicular to the base. The stand includes a rotatable insert portion and a cover. The rotatable insert portion receives the information handling system. The cover snap fits over the information handling system when the information handling system is within the cradle, and when the cover rotates between an open position and a closed position.

12 Claims, 7 Drawing Sheets

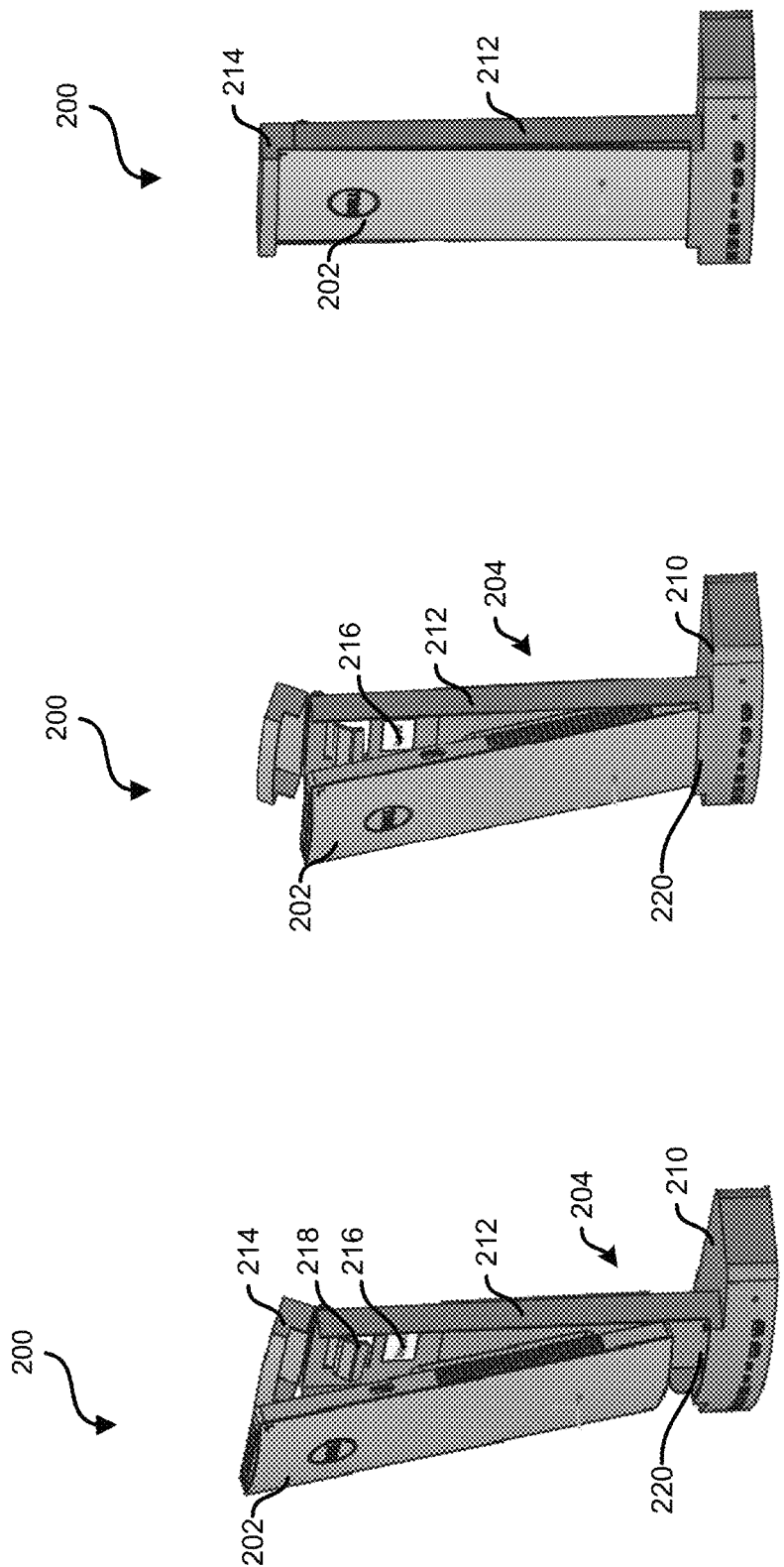

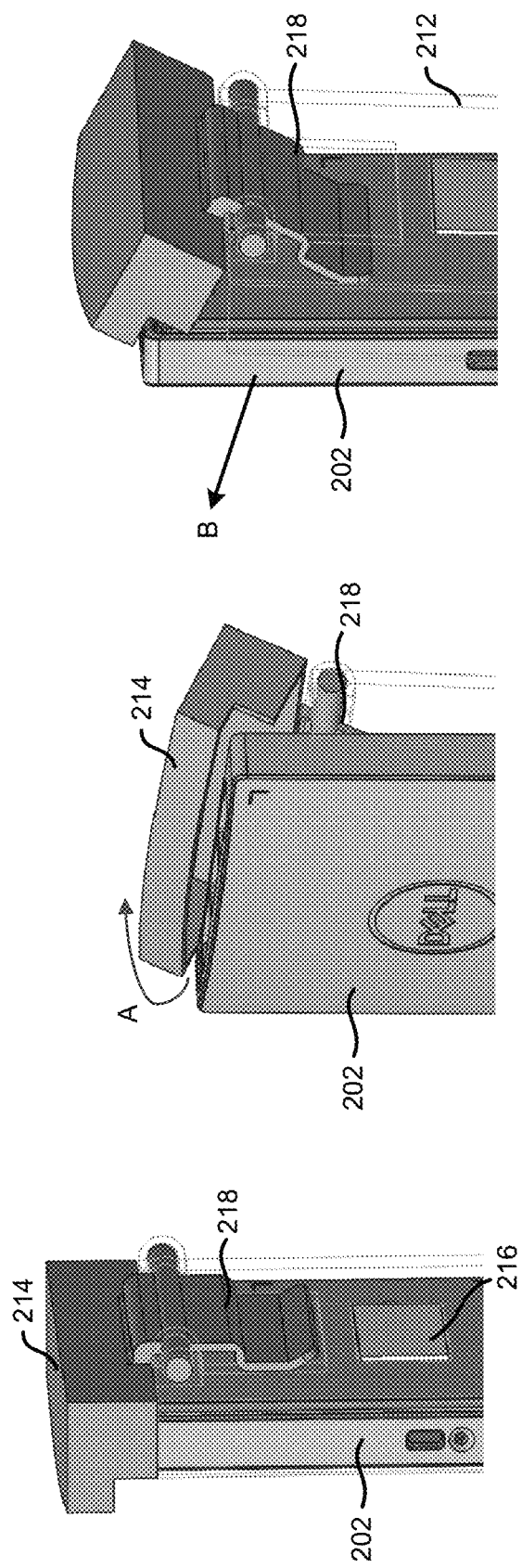

CRADLE FOR AN INFORMATION HANDLING SYSTEM

FIELD OF THE DISCLOSURE

The present disclosure generally relates to information handling systems, and more particularly relates to a cradle for a mobile information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A cradle for an information handling system includes a base and a stand. The stand extends perpendicular to the base. The stand may include a rotatable insert portion and a cover. The rotatable insert portion may receive the information handling system. The cover may snap fit over the information handling system when the information handling system is within the cradle, and when the cover rotates between an open position and a closed position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 2-4 are diagrams illustrating insertion of an information handling system into a cradle according to at least one embodiment of the present disclosure;

FIGS. 8-10 are diagrams illustrating an opening of a cover to release an information handling system from a cradle according to at least one embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
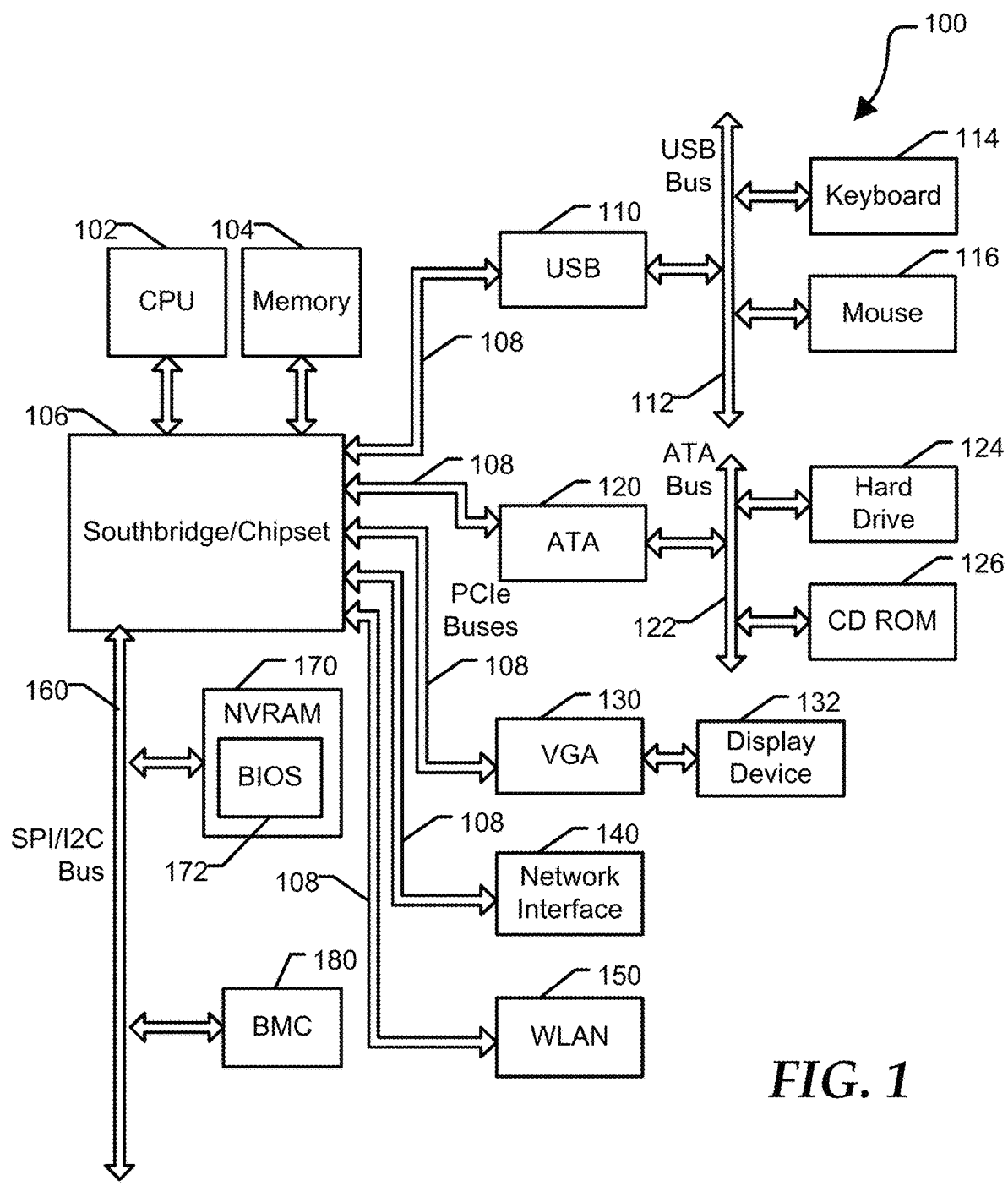
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIGS. 2-13 show different portions of an information handling system 202 and a cradle 204, and different interface stages of the information handling system with the cradle according to at least one embodiment of the present disclosure. Cradle 204 includes a base 210, a stand 212, a cover 214, a magnet 216, and a hinge arm 218. In an example, information handling system 202 may be any suitable information handling system including, but not limited to, information handling system 100 of FIG. 1 and may include some or all of the components of the information handling system. As discussed above, information handling system 202 may be housed in stand 212, and coupled to a display device on the stand. However, the teaching of the present disclosure may be beneficial to a variety of devices and/or systems, and thus those devices and systems are envisioned as falling within the scope of the present disclosure as well.

As illustrated in FIG. 2, information handling system 202 may be in a first alignment stage with cradle 204. In an example, the first alignment stage may include a bottom portion of information handling system 202 may be inserted within stand 212, such that the side surfaces of the information handling system may be placed in physical communication with sides of the stand. Additionally, in the first alignment stage, hinge arm 218 may be rotated forward and into stand 212. In an example, the rotation of hinge arm 218 into stand 212 may cause cover 214 to rotate upward and backward into an opened position. The rotation of cover 214 may allow information handling system 202 to be placed within stand 212 of cradle 204.

When information handling system 202 in placed in a second alignment stage, as shown in FIG. 3, a bottom surface of information handling system 202 may be placed within a rotating insert portion 220 of cradle 204. In an example, rotating insert portion 220 may be biased in a position to allow the bottom surface of information handling system 202 to be inserted as shown in and described in greater detail with respect to FIG. 11 below.

Upon the bottom surface of information handling system 202 being inserted within rotating insert portion 220, the remainder of the information handling system may be placed within stand 212 via any suitable manner. For example, a user may push information handling system 202 toward stand 212. In an example, as information handling system 202 is pushed within one or more actions may occur within cradle 204. For example, rotating insert portion 220 may rotate from an open position to a closed position, which in turn may enable information handling system 202 to be placed within stand 212. Additionally, as information handling system 202 is inserted within stand 212, the information handling system may be placed in physical communication with hinge arm 218. As information handling system 202, is pushed further within stand 212, the information handling system may exert a force on hinge arm 218 that may cause the hinge arm to rotate out of the stand. In an example, as hinge arm 218 is rotated out of stand 212, cover 214 may be rotated from the opened position to a closed position. In certain examples, hinge arm 218 may be physically connected to cover 214, such that rotation of the hinge arm may cause rotation of the cover. While cover 214 is in the closed position, the cover surrounds and is in physical communication with a top portion of information handling system 202, such that the information handling system is securely held within stand 212 of cradle 204 as shown in FIG. 4.

Figure 5:
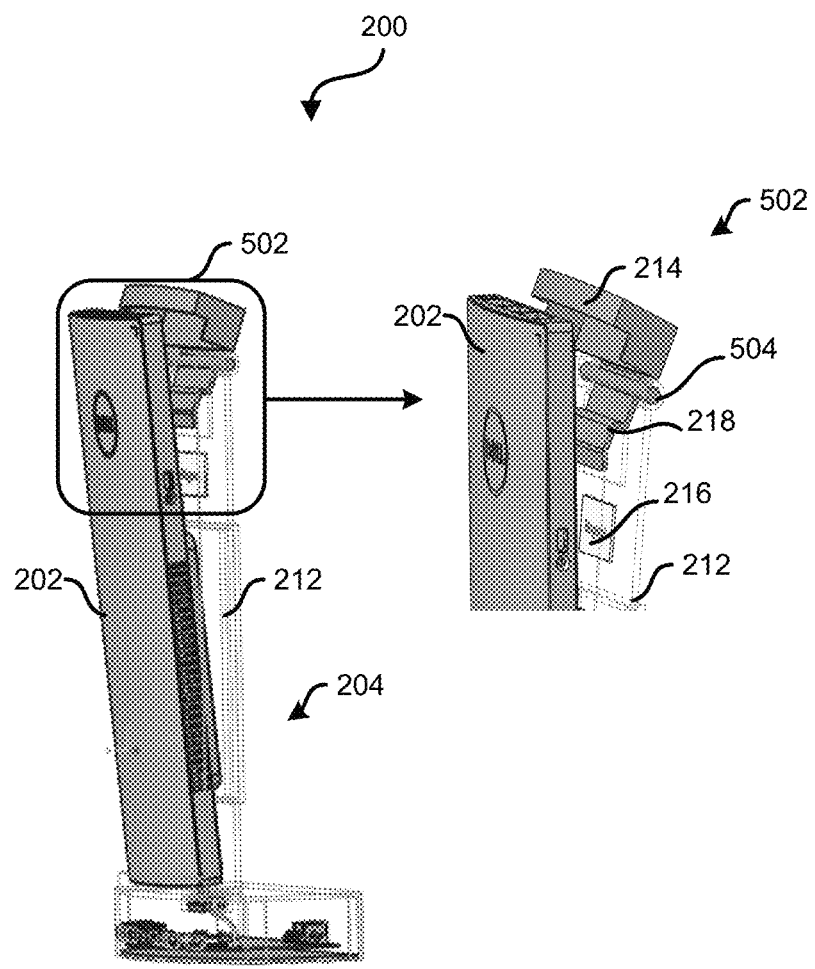
FIG. 5 is a diagram of an enlarged view of a cover, a hinge, and an arm of a cradle according to at least one embodiment of the present disclosure.

Referring now to FIG. 5, an enlarged view of a portion 502 of cradle 204 is illustrated according to at least one embodiment of the present disclosure. For example, FIG. 5 shows a hinge 504, stand 212, cover 214, magnet 216, and hinge arm 218 of cradle 204. In an example, hinge 504 may physically link cover 214 and hinge arm 218, such that rotation of one component causes the other component to rotate. For example, when information handling system 202 is placed in physical communication with hinge arm 218 and pushes the hinge arm out of stand 212, the hinge arm may cause cover 214 to rotate around hinge 504. In this example, cover 214 may rotate from an opened position to a closed position. In certain examples, as information handling system 202 is pushed within stand 212, magnet 216 may exert a force on the information handling system to secure the information handling system within the stand.

Figure 6:
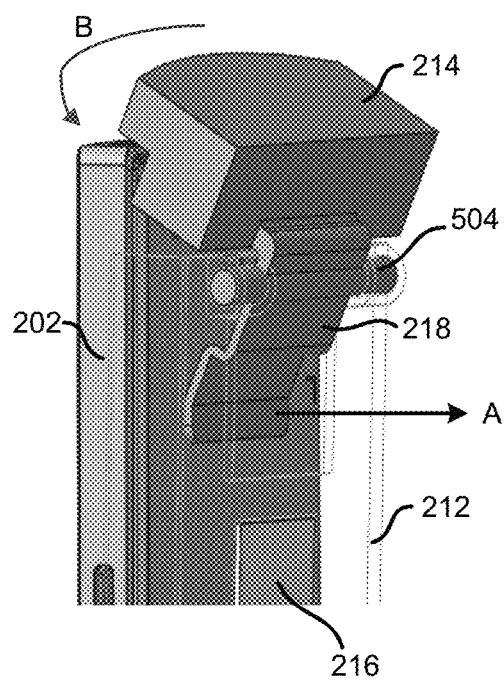
FIGS. 6 and 7 are diagrams of a cover of a cradle snap fitting over an information handling system according to at least one embodiment of the present disclosure.

Referring now to FIG. 6, the force exerted by magnet 216 may pull information handling system within stand 212 and toward hinge arm 218. Information handling system 202 may push hinge arm 218 in the direction of arrow A as shown in FIG. 6. As hinge arm 218 is moved in the direction of arrow A, the hinge arm may rotate cover 214 to a closed position in the direction of arrow B.

Figure 7:
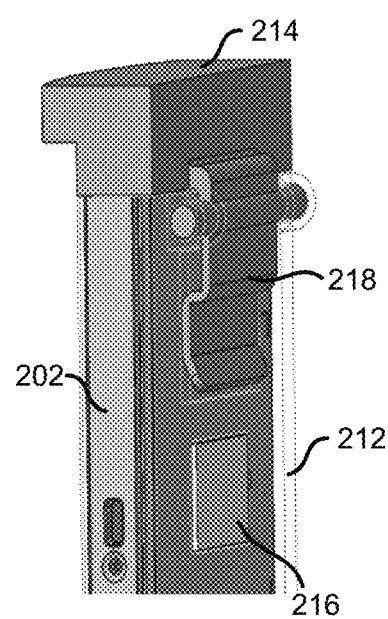

FIG. 7 shows cover 214 in a closed position over the top of information handling system 202. In this example, magnet 216 may continually provide the force to pull information handling system 202 within stand 212. The force exerted by information handling system 202 on hinge arm 218 may in turn hold cover 214 in the closed position to avoid the cover from opening accidentally.

FIGS. 8-10 show a sequence of cover 214 moving from a closed position to an opened position to release information handling system 202 from cradle 204 according to at least one embodiment of the present disclosure. Referring now to FIG. 8, magnet 216 applies an attraction force on information handling system 202, which in turn may hold or fix hinge arm 218 in place. Hinge arm 218 may hold cover 214 in the closed position. Referring now to FIG. 9, cover 214 may be lifted up and rotated in any suitable manner. For example, a user may lift cover 214 in the direction of arrow A, which in turn may cause hinge arm 218 to push information handling system 202 out of stand 202 in the direction of arrow B.

Figure 11:
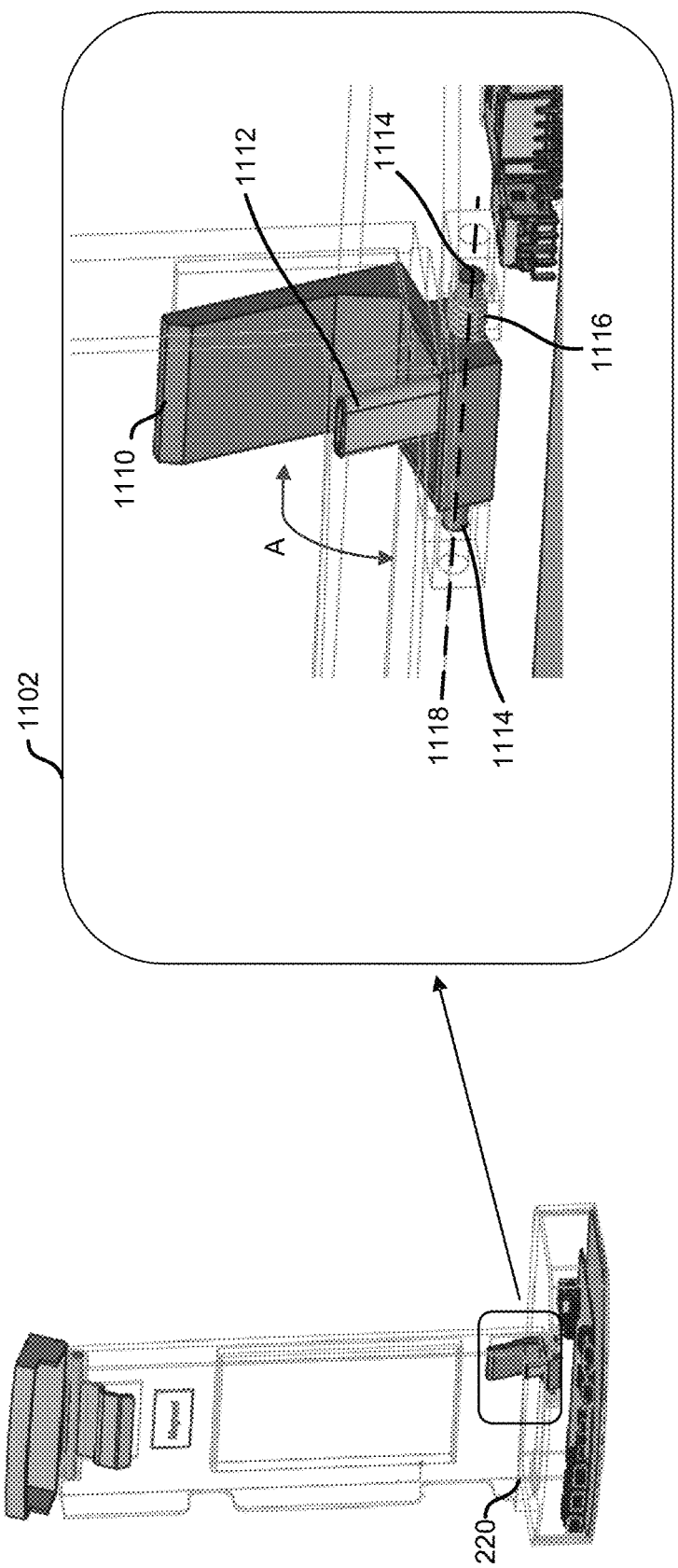
FIG. 11 is an enlarged view of a rotation portion of a cradle according to at least one embodiment of the present disclosure.

FIG. 11 shows an enlarged view of a portion 1102 of rotation insert portion 220 of cradle 204 according to at least one embodiment of the present disclosure. In an example, rotation insert portion 220 includes a communication plug holder 1110, a communication plug 1112, rotation pins 1114, and a spring 1116. In certain examples, communication plug 1112 may be any suitable type of plug to allow both power and communication to an information handling system, such as information handling system 202. For example, communication plug 1112 may be a universal serial bus (USB) type C plug.

In an example, rotating pins 1114 may enable communication plug holder 1110 to rotate along a rotation axis 1118. In certain examples, spring 1116 may bias communication plug holder 1110 toward a forward position as shown in FIG. 11. In an example, the forward position may result in communication plug 1112 being angled toward the front of rotation insert portion 220. In response to a rotational force being applied to communication plug holder 1110, the communication plug holder may rotate from the forward position to a back position. When the force is removed, communication plug holder 1110 may rotate from the back position to the forward position based on the force from spring 1116. In an example, the rotation direction from the forward position to the back position and then to the forward position is represented by arrow A in FIG. 11. In certain examples, the force required to rotate communication plug 1110 from the forward position to the back position may be any suitable force greater than the force exerted by spring 1116.

Figure 13:
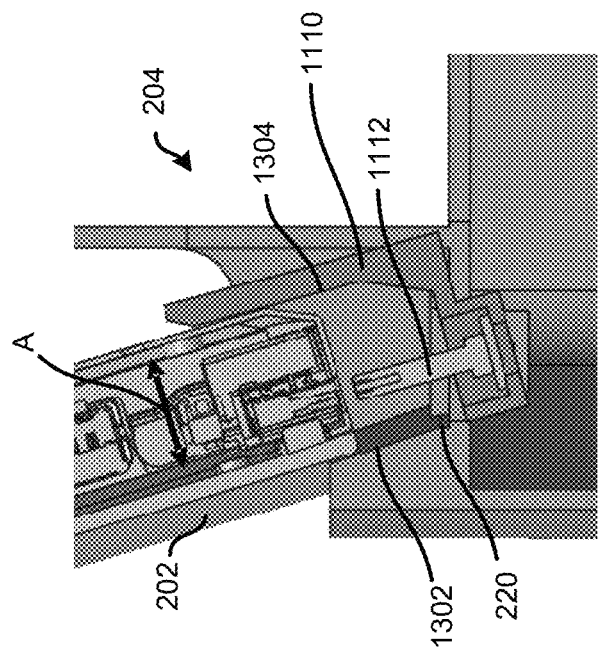
FIGS. 12 and 13 are diagrams illustrating insertion of an information handling system into slot of a rotation portion of a cradle according to at least one embodiment of the present disclosure.
Figure 12:
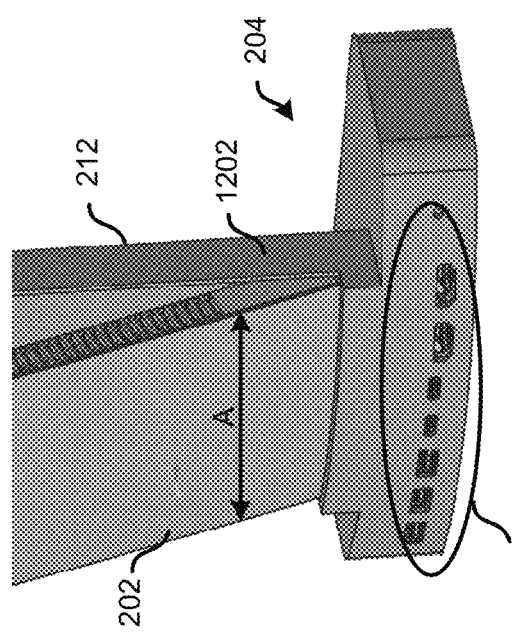

FIGS. 12 and 13 show alignment of information handling system 202 into cradle 204 according to at least one embodiment of the present disclosure. Referring now to FIG. 12, sides 1202 of stand 212 may provide alignment of information handling system 202 in a first direction as represented by arrow A. In an example, the alignment in the first direction may be provided in response to sides 1204 of information handling system 202 being placed in physical communication with sides 1202 of stand 212. In an example, base 210 may include multiple ports 1210 which may be any suitable types of ports including, but not limited to, different types of video ports, communication ports, and audio ports.

Referring now to FIG. 13, a front chin surface 1302 of rotating insert portion 220 of cradle 204 and a surface 1304 of communication plug holder 1110 may provide alignment of information handling system 202 in a second direction represented by arrow A. In an example, one surface of information handling system 202 may be placed in physical communication with front chin surface 1302 and a second surface of the information handling system may be placed in physical communication with the surface 1304 of communication plug holder 1110. In response to the physical communication between information handling system 202 and surfaces 1302 and 1304, the information handling system may be properly aligned in the second direction so that communication plug 1112 may be inserted within the information handling system. Thus, cradle 204 may receive and hold information handling system 202 in such a manner as to allow a user to easily insert and remove the information handling system from the cradle.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A cradle for an information handling system, the cradle comprising:
    a base; and
    a stand extending perpendicular to the base, the stand including:
        a rotatable insert portion to receive the information handling system;
        a cover to snap fit over a top portion of the information handling system when the information handling system is within the cradle and when the cover rotates between an open position and a closed position;
        a hinge;
        a hinge arm physically coupled to the cover via the hinge, the hinge arm being placed in physical communication with the information handling system to hold the cover in the closed position; and
        a magnet located within the stand, the magnet to hold the information handling system within the stand wherein a force exerted by the magnet on the information handling system causes the hinge arm to rotate around the hinge and place the cover in the closed position.

2. The cradle of claim 1, wherein the hinge arm further pushes the information handling system out of the cradle in response to the cover being lifted from physical communication with the information handling system.

3. The cradle of claim 1, wherein the hinge arm is attached to the cover and rotation of the hinge arm also rotates the cover.

4. The cradle of claim 1, the rotatable insert portion comprises:
    a spring to bias the rotatable insert portion in a tilted and angled position to receive the information handling system.

5. The cradle of claim 1, wherein the rotatable insert portion further comprises:
    a communication plug configured to communicate with the information handling system while the information handling system is inserted within the cradle.

6. A system comprising:
    an information handling system; and
    a cradle including:
        a base; and
        a stand extending perpendicular to the base, the standing including:
            a rotatable insert portion to receive the information handling system;
            a cover to snap fit over a top portion of the information handling system when the information handling system is within the cradle and when the cover rotates between an open position and a closed position;
            a hinge;

a hinge arm physically coupled to the cover via the hinge, the hinge arm being placed in physical communication with the information handling system to hold the cover in the closed position; and a magnet located within the stand, the magnet to hold the information handling system within the stand, wherein a force exerted by the magnet on the information handling system causes the hinge arm to rotate around the hinge and place the cover in the closed position.

7. The system of claim 6, wherein the hinge arm further pushes the information handling system out of the cradle in response to the cover being lifted from physical communication with the information handling system.

8. The system of claim 6, wherein the hinge arm is attached to the cover and rotation of the hinge arm around also rotates the cover.

9. The system of claim 6, the rotatable insert portion comprises:
a spring to bias the rotatable insert portion in a tilted and angled position to receive the information handling system.

10. The system of claim 6, wherein the rotatable insert portion further comprises:
a communication plug configured to communicate with the information handling system while the information handling system is inserted within the cradle.

11. A cradle for an information handling system, the cradle comprising:
a base; and
a stand extending perpendicular to the base, the standing including:
a rotatable insert portion to receive the information handling system, wherein the rotatable insert portion includes front and back walls to control alignment of the information handling system within the cradle in a first direction, and first and second side walls to control alignment of the information handling system within the cradle in a second direction;
a cover to snap fit over a top portion of the information handling system when the information handling system is within the cradle and when the cover rotates between an open position and a closed position;
a hinge;
a hinge arm physically coupled to the cover via the hinge, the hinge arm being placed in physical communication with the information handling system to hold the cover in the closed position; and
a magnet located within the stand, the magnet to hold the information handling system within the stand, wherein a force exerted by the magnet on the information handling system causes the hinge arm to rotate around the hinge and place the cover in the closed position.

12. The cradle of claim 11, wherein the hinge arm further pushes the information handling system out of the cradle in response to the cover being lifted from physical communication with the information handling system.

* * * * *